United States Patent
Deneau (10) Patent No.: US 6,684,305 B1
(45) Date of Patent: Jan. 27, 2004

(54) MULTIPROCESSOR SYSTEM IMPLEMENTING VIRTUAL MEMORY USING A SHARED MEMORY, AND A PAGE REPLACEMENT METHOD FOR MAINTAINING PAGED MEMORY COHERENCE

(75) Inventor: Thomas M. Deneau, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 149 days.

(21) Appl. No.: 09/841,469

(22) Filed: Apr. 24, 2001

(51) Int. Cl.[7] .............................................. G06F 12/10
(52) U.S. Cl. ...................... 711/159; 711/133; 711/141; 711/155; 711/160; 711/156
(58) Field of Search ................................ 711/147, 155, 711/156, 159, 160, 133, 141

(56) References Cited

U.S. PATENT DOCUMENTS

| | | | |
|---|---|---|---|
| 4,092,715 A | | 5/1978 | Scriver ........................ 364/200 |
| 5,497,480 A | * | 3/1996 | Hayes et al. ................. 711/166 |
| 6,263,403 B1 | * | 7/2001 | Traynor ....................... 711/133 |
| 6,286,092 B1 | * | 9/2001 | Frank et al. ................. 711/207 |
| 6,345,352 B1 | * | 2/2002 | James et al. ................. 711/210 |
| 6,430,670 B1 | * | 8/2002 | Bryg et al. ................... 711/216 |

FOREIGN PATENT DOCUMENTS

| | | | |
|---|---|---|---|
| EP | 0766177 A | 4/1998 | ........... G06F/12/10 |
| WO | 98/14878 A | 4/1997 | ........... G06F/12/10 |

OTHER PUBLICATIONS

International PCT Search Report PCT/US 02/02898 dated Dec. 27, 2002.

International PCT Search Report PCT/US 97/17138 dated Dec. 30, 1997.

* cited by examiner

Primary Examiner—T. Nguyen
(74) Attorney, Agent, or Firm—Williams, Morgan & Amerson (57) ABSTRACT

A computer system including a first processor, a second processor in communication with the first processor, a memory coupled to the first and second processors (i.e., a shared memory) and including multiple memory locations, and a storage device coupled to the first processor. The first and second processors implement virtual memory using the memory. The first processor maintains a first set of page tables and a second set of page tables in the memory. The first processor uses the first set of page tables to access the memory locations within the memory. The second processor uses the second set of page tables, maintained by the first processor, to access the memory locations within the memory. A virtual memory page replacement method is described for use in the computer system, wherein the virtual memory page replacement method is designed to help maintain paged memory coherence within the multiprocessor computer system.

15 Claims, 8 Drawing Sheets

PTE 302/402 FORMAT:

MULTIPROCESSOR SYSTEM IMPLEMENTING VIRTUAL MEMORY USING A SHARED MEMORY, AND A PAGE REPLACEMENT METHOD FOR MAINTAINING PAGED MEMORY COHERENCE

BACKGROUND OF THE INVENTION

1. Field of the Invention

This invention relates generally to computer systems, and, more particularly, to multiprocessor systems wherein multiple processors implement virtual memory and access a shared memory.

2. Description of the Related Art

A typical computer system includes a memory hierarchy to obtain a relatively high level of performance at a relatively low cost. Instructions of several different software programs are typically stored on a relatively large but slow non-volatile storage unit (e.g., a disk drive unit). When a user selects one of the programs for execution, the instructions of the selected program are copied into a main memory, and a processor (e.g., a central processing unit or CPU) obtains the instructions of the selected program from the main memory. Well-known virtual memory management techniques allow the processor to access data structures larger in size than that of the main memory by storing only a portion of the data structures within the main memory at any given time. Remainders of the data structures are stored within the relatively large but slow non-volatile storage unit, and are copied into the main memory only when needed.

Virtual memory is typically implemented by dividing an address space of the processor into multiple blocks called page frames or "pages." Only data corresponding to a portion of the pages is stored within the main memory at any given time. When the processor generates an address within a given page, and a copy of that page is not located within the main memory, the required page of data is copied from the relatively large but slow non-volatile storage unit into the main memory. In the process, another page of data may be copied from the main memory to the non-volatile storage unit to make room for the required page.

Popular processor architectures (e.g., the 80x86 or "x86" processor architecture) typically include specialized hardware elements to support implementation of virtual memory. For example, the x86 processor architecture includes specialized hardware elements to support a protected virtual address mode (i.e., a protected mode). Such processors produce virtual addresses, and implement virtual-to-physical address translation mechanisms to "map" the virtual addresses to physical addresses of memory locations in the main memory. The address translation mechanisms typically include one or more data structures (i.e., "page tables") arranged to form a hierarchy. The page tables are typically stored in the main memory and are maintained by operating system software (i.e., an operating system). A highest-ordered page table (e.g., the x86 page directory) is always located within the main memory. Any additional page tables may be obtained from the storage unit and stored in the main memory as needed.

A base address of a memory page containing the highest-ordered page table (e.g., the x86 page directory) is typically stored in a register. The highest-ordered page table includes multiple entries. The entries may be base addresses of other page tables, or base addresses of pages including physical addresses corresponding to virtual addresses. Where multiple page tables are used to perform the virtual-to-physical address translation, entries of the highest-ordered page table are base addresses of other page tables. A virtual address produced by the processor is divided into multiple portions, and the portions are used as indexes into the page tables.

A lowest-ordered page table includes an entry storing a base address of the page including the physical address corresponding to the virtual address. The physical address is formed by adding a lowest-ordered or "offset" portion of the virtual address to the base address in the selected entry of the lowest-ordered page table.

The above described virtual-to-physical address translation mechanism requires accessing one or more page tables in main memory (i.e., page table "lookups" or "walks"). Such page table accesses require significant amounts of time, and negatively impact processor performance. Consequently, processors typically include a translation look-aside buffer (TLB) for storing the most recently used page table entries. TLB entries are typically maintained by the operating system. Inclusion of the TLB significantly increases processor performance.

It would be beneficial to extend the benefits of virtual memory to multiprocessor systems including multiple processors. Such multiprocessor systems may advantageously have a main memory shared by all of the processors. The ability of all processors to access instructions and data (i.e., "code") stored in the shared main memory eliminates the need to copy code from one memory accessed exclusively by one processor to another memory accessed exclusively by another processor. Additionally, a portion of the shared main memory may be used for interprocess communication.

Several problems arise in multiprocessor systems implementing virtual memory and having a shared main memory. One problem is how to create and maintain virtual memory data structures (e.g., page tables), and how to coordinate transfers of pages between the main memory and one or more storage units. Another problem, referred to herein as the "TLB coherence problem," arises when each of the multiple processors expectedly has its own performance-enhancing TLB. As described above, each page table entry corresponds to a different page in the shared main memory. When one of the processors replaces a page in the shared main memory with a page from the storage unit, TLB entries corresponding to the replaced page in the other processors become invalid. One or more of the other processors may use such invalid page table entries in their TLBs to perform virtual-to-physical address translations, thereby accessing wrong pages in memory, and possibly causing incorrect results to be produced and/or other errors in system operation.

Moreover, to further preclude page table accesses in main memory, write accesses to pages in main memory may be recorded in "dirty" bits stored in the TLBs rather than having to access dirty bits of the corresponding page table entries in the shared main memory. Not having visibility into the TLBs of the other processors, a processor replacing a page in the shared main memory may not know that one of the other processors had previously written to the replaced page, and thus may not write the replaced page back to storage. As a result, data in the replaced page may not be correct, possibly causing incorrect results to be produced and/or other errors in system operation.

The present invention is directed to a system which implements a method that may solve, or at least reduce, some or all of the aforementioned problems.

SUMMARY OF THE INVENTION

A computer system is presented including a first processor, a second processor in communication with the first processor, and a memory coupled to the first and second processors (i.e., a shared memory) and including multiple memory locations, and a storage device coupled to the first processor. The first and second processors implement virtual memory using the memory. The first processor maintains a first set of page tables and a second set of page tables in the memory, and uses the first set of page tables to access the memory locations within the memory. The second processor uses the second set of page tables, maintained by the first processor, to access the memory locations within the memory.

The first and second sets of page tables may include at least one page table. The first processor may use the first set of page tables to translate a virtual address generated within the first processor to a corresponding physical address of a memory location within the memory, and may use the physical address of the memory location to access the memory location. Similarly, the second processor may use the second set of page tables to translate a virtual address generated within the second processor to a corresponding physical address of a memory location within the memory, and may use the physical address of the memory location to access the memory location.

The second set of page tables may include multiple page table entries. Each of the page table entries may be used to store a base address of a corresponding memory page when the corresponding memory page is present in the memory. The second processor may include a buffer, wherein the buffer includes multiple entries for storing recently used page table entries and recording write accesses by the second processor to the corresponding memory pages. Before replacing a memory page present in the memory with a memory page stored in the storage device, the first processor may inform the second processor of a need to remove any entries of the buffer corresponding to a physical address range of the memory page to be replaced.

A virtual memory page replacement method is described for use in a computer system including a first and second processor, wherein the virtual memory page replacement method is designed to help maintain paged memory coherence within the multiprocessor computer system. In one embodiment, the method includes accessing each page table entry of a set of page table entries of the second processor. Each page table entry of the set of page table entries corresponds to a different memory page (i.e., page) of a set of pages of the second processor. Each page of the set of pages of the second processor is stored in a memory and corresponds to a first page of the first processor to be removed from the memory. Each page table entry of the second processor includes a dirty (D) bit indicating whether or not the corresponding page of the second processor needs to be written to a storage.

Each page table entry of the set of page table entries is marked to indicate the corresponding page of the second processor is not present in the memory. For example, a present (P) bit of each page table entry of the set of page table entries may be changed (e.g., "cleared" or set to logic '0') to indicate the corresponding page of the second processor is not present in the memory. The second processor is informed of a need to remove any entry of a buffer of the second processor corresponding to a page of the set of pages, wherein the buffer includes multiple entries for storing recently used page table entries. Each entry of the buffer may include a dirty (D) bit indicating whether or not a corresponding page of the second processor needs to be written to the storage.

A read of each page table entry of the set of page table entries is performed after the above described informing of the second processor. A read of a page table entry corresponding to the first page of the first processor is performed, wherein the page table entry includes a dirty (D) bit indicating whether or not the first bit needs to be written to the storage. The first page of the first processor is written from the memory to the storage if: (i) a dirty (D) bit of at least one page table entry obtained during the read of each page table entry of the set of page table entries indicates the corresponding page of the second processor needs to be written to the storage, or (ii) the dirty (D) bit of the page table entry obtained during the read of the page table entry of the first processor indicates the first page of the first processor needs to be written to the storage.

In other embodiments, both the present (P) bit and the dirty (D) bit of each page table entry of the set of page table entries may be cleared during the above described marking. In such embodiments, the accessing of each page table entry of the set of page table entries may include a first read operation, and the above described reading of each page table entry of the set of page table entries, performed after the informing, may constitute a second read operation. The first page of the first processor may be written from the memory to the storage if: (i) a dirty (D) bit of at least one page table entry obtained during the first read operation indicates the corresponding page of the second processor needs to be written to the storage, or (ii) a dirty (D) bit of at least one page table entry obtained during the second read operation indicates the corresponding page of the second processor needs to be written to the storage, or (iii) the dirty (D) bit of the page table entry obtained during the read of the page table entry of the first processor indicates the first page of the first processor needs to be written to the storage.

The virtual memory page replacement method may include responding to the above described informing of the second processor by: (i) locating an entry of the buffer corresponding to a page of the set of pages; (ii) if the dirty (D) bit of the entry corresponding to the page of the set of pages indicates the page of the set of pages needs to be written to the storage, updating the dirty (D) bit of the page table entry of the second processor corresponding to the page of the set of pages to indicate that the page of the set of pages needs to be written to the storage; and (iii) clearing the entry corresponding to the page of the set of pages.

The above described informing of the second processor may include sending a message to the second processor indicating a need to clear any entry of the buffer of the second processor corresponding to a page of the set of pages.

The virtual memory page replacement method may also include: (i) receiving an indication of a page fault condition in the second processor; and (ii) determining that a first page of the first processor, stored in the memory, must be replaced by a second page of the first processor, stored in the storage, to clear the page fault condition in the second processor. The above described receiving of the indication may include receiving a message from the second processor indicating a page fault condition in the second processor. The virtual memory page replacement method may also include sending a message to the second processor indicating page fault condition resolution when the page fault condition in the second processor has been resolved.

A carrier medium is described including program instructions for carrying out the virtual memory page replacement method. The carrier medium may be, for example, a computer-readable storage medium (e.g., a floppy disk or a compact disk read only memory (CD-ROM) disk).

BRIEF DESCRIPTION OF THE DRAWINGS

The invention may be understood by reference to the following description taken in conjunction with the accompanying drawings, in which like reference numerals identify similar elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
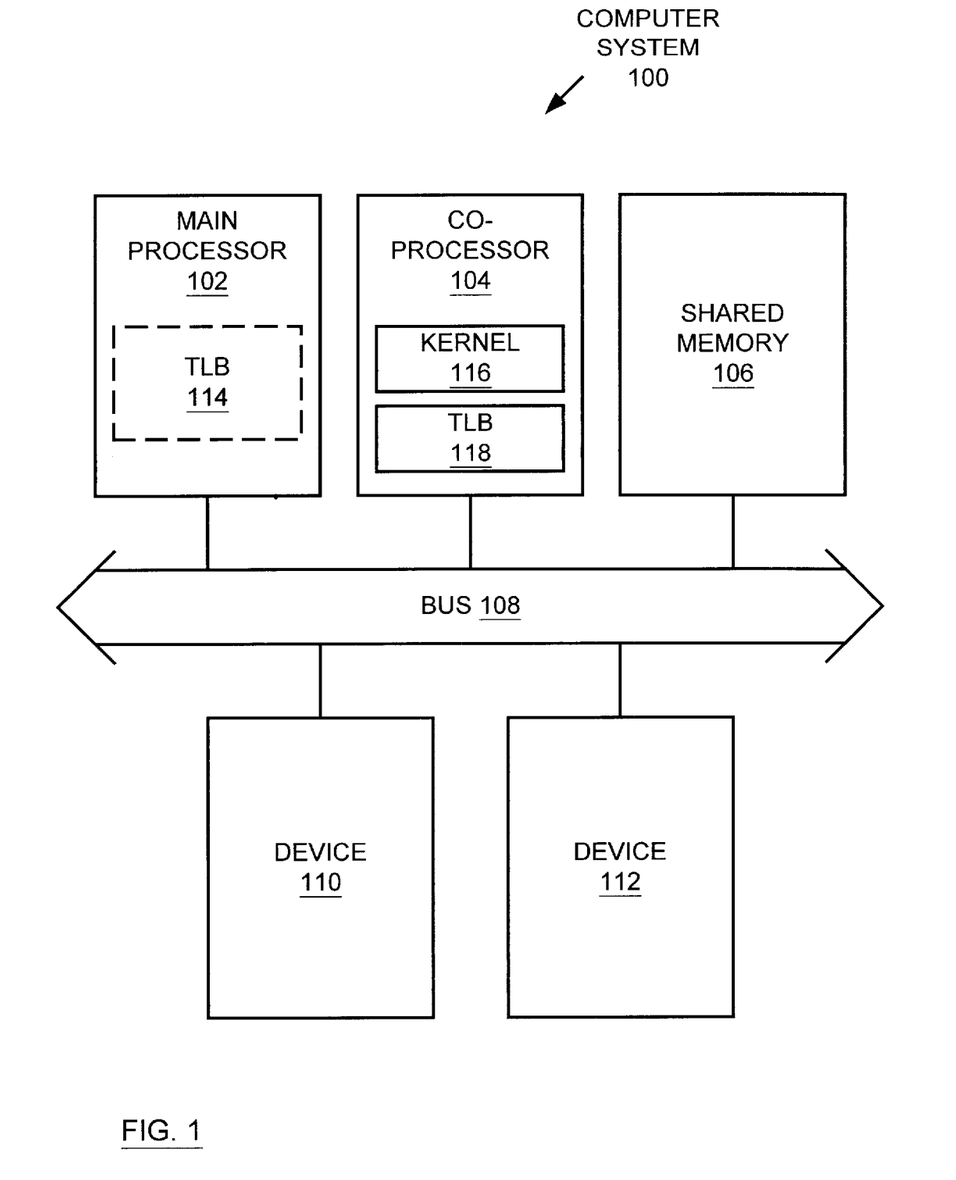
FIG. 1 is a diagram of one embodiment of a multiprocessor computer system including a main processor, a co-processor, and a shared memory.

FIG. 1 is a diagram of one embodiment of a multiprocessor computer system 100 including a main processor 102, a co-processor 104, a shared memory 106, a first device 110, and a second device 112, all coupled to a bus 108. The main processor 102 and the co-processor 104 are both configured to execute instructions. Both the main processor 102 and the co-processor 104 read data from and write data to (i.e., access) the shared memory 106 via the bus 108. The main processor 102 communicates with the co-processor 104 via the bus 108 and/or the shared memory 106. The main processor 102 and/or the co-processor 104 communicate with the devices 110 and 112 via the bus 108. The device 110 may be, for example, a storage device (e.g., a hard disk drive). The device 112 may be, for example, a communication device (e.g., a modem, a network interface card, etc.), an input/output device (e.g., a keyboard, a pointing device, a printer, a scanner, etc.), or another storage device (e.g., another hard disk drive). The bus 108 may be any suitable bus structure.

In the embodiment of FIG. 1, the main processor 102 directs the activities of the co-processor 104 such that the co-processor 104 may be said to assist the main processor 102. The main processor 102 and the co-processor 104 may be the same type of processor, or substantially similar types of processors, and may have similar architectures and functional capabilities. Alternately, the main processor 102 and the co-processor 104 may be different types of processors, and may have different architectures and/or different functional capabilities. The main processor 102 and the co-processor 104 may execute instructions from the same instruction set, or from different instruction sets.

As will be described below, the main processor 102 executes instructions of operating system software stored in the shared memory 106 during operation. The operating system software implements virtual memory using the shared memory 106 and the device 110 and/or the device 112, and embodies a virtual-to-physical address translation mechanism. The operating system software creates and maintains a set of main processor page tables in the shared memory 106 used to perform virtual-to-physical address translations within the main processor 102. A lowest-ordered page table of the main processor 102, stored in the shared memory 106, includes multiple page table entries. To reduce the number of memory accesses required to obtain page table entries from the lowest-ordered page table of the main processor 102, and thereby increase the performance of the main processor 102, the main processor 102 preferably includes an optional translation look-aside buffer (TLB) 114 for storing recently used page table entries.

In the embodiment of FIG. 1, the co-processor 104 includes a kernel 116 and a TLB 118. The kernel 116 includes instructions and data (i.e., code) that allows the co-processor 104 to run processes issued to the co-processor 104 by the main processor 102. During operation, the co-processor 104 executes instructions of the kernel 116, and runs processes issued to the co-processor 104 by the main processor 102. Each process issued to the co-processor 104 exists within the shared memory 106, and typically includes code.

As will be described below, the kernel 116 embodies a virtual-to-physical address translation mechanism, and accesses physical addresses within the shared memory 106 using a set of co-processor page tables. The set of co-processor page tables is created and maintained by the operating system software running on the main processor 102. A lowest-ordered page table of the co-processor 104, stored in the shared memory 106, includes multiple page table entries. The TLB 118 is used to store recently used page table entries, and is included in the co-processor 104 to reduce the number of memory accesses required to obtain page table entries from the lowest-ordered page table of the co-processor 104, and thereby increase the performance of the co-processor 104.

Figure 2:
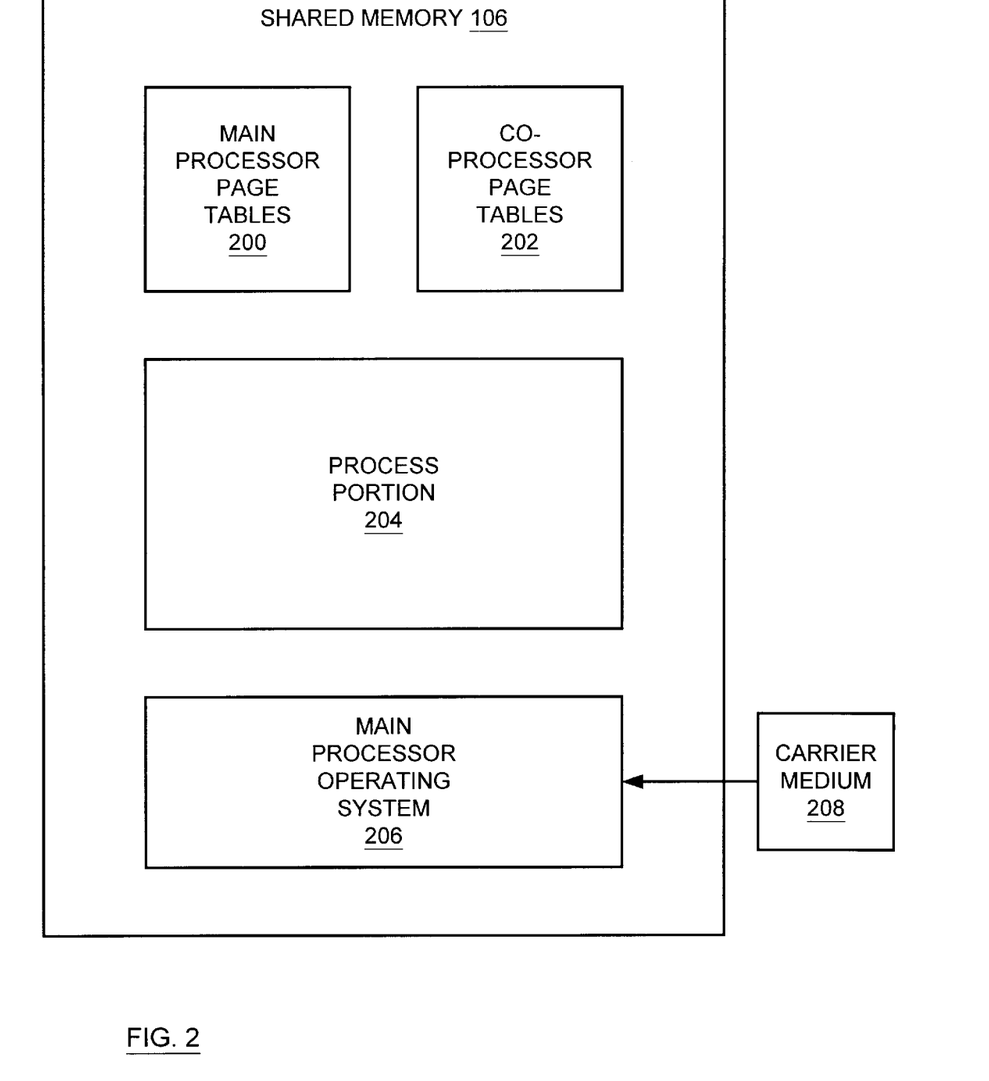
FIG. 2 is a diagram of one embodiment of the shared memory of FIG. 1, wherein the shared memory includes main processor page tables, co-processor page tables, a process portion, and a main processor operating system.

FIG. 2 is a diagram of one embodiment of the shared memory 106 of FIG. 1. In the embodiment of FIG. 2, the shared memory 106 includes main processor page tables 200, co-processor page tables 202, a process portion 204, and a main processor operating system 206. As described above, the main processor 102 (FIG. 1) executes instructions of the main processor operating system 206 during operation. As will be described in detail below, the main processor operating system 206 implements virtual memory within the main processor 102 and the co-processor 104 (FIG. 1) using the shared memory 106 and the device 110 and/or the device 112 (FIG. 1). The process portion 204 includes memory pages accessible by both the main processor 102 and the co-processor 104, and is used to store process code. During operation, the co-processor 104 accesses and executes process code stored within the process portion 204 according to instructions from the main processor 102.

The main processor operating system 206 creates and maintains both the main processor page tables 200 and the co-processor page tables 202, and embodies virtual-to-physical address translation mechanisms of both the main processor 102 and the co-processor, 104. The main processor page tables 200 are used by the main processor 102 to translate virtual addresses generated within the main processor 102 to physical addresses within the shared memory 106. The co-processor page tables 202 are used by the co-processor 104 to translate virtual addresses generated within the co-processor 104 to physical addresses within the shared memory 106. The main processor 102 and the co-processor 104 share a common physical address space within the shared memory 106. For simplicity of operation, the main processor 102 and the co-processor 104 may also share a common virtual address space.

A carrier medium 208 in FIG. 2 may be used to convey the main processor operating system 206 to the shared memory 106. For example, the device 112 (FIG. 1) may be a disk drive for receiving removable disks (e.g., a floppy disk drive, a compact disk read only memory or CD-ROM drive, etc.), and the carrier medium 208 may be a disk (e.g., a floppy disk, a CD-ROM disk, etc.) embodying the main processor operating system 206. The main processor 102 (FIG. 1) may read the code of the main processor operating system 206 from the carrier medium 208 via the device 112 and store the code in the shared memory 106.

Alternately, the carrier medium 208 may be a signal (e.g., a carrier signal) used to convey the main processor operating system 206. For example, the device 112 may be a network interface card, and the carrier medium 208 may be a signal (e.g., an electrical signal or an optical signal) conveyed via a transmission medium coupled to the device 112. The main processor 102 may receive the code of the main processor operating system 206 via the device 112 and the carrier medium 208, and store the code in the shared memory 106.

Figure 3:
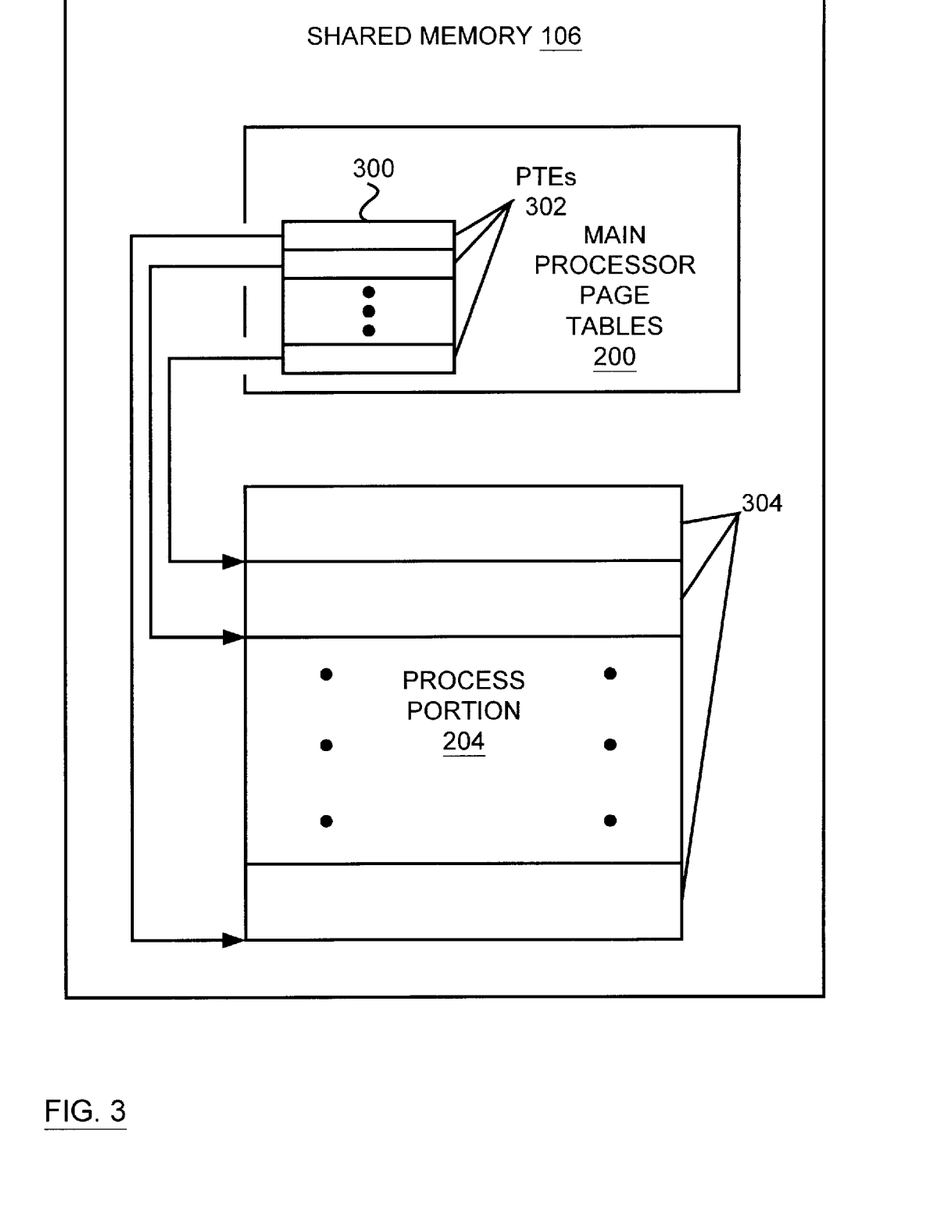
FIG. 3 is a diagram of one embodiment of the main processor page tables and the process portion of FIG. 2, wherein the process portion includes multiple pages of the main processor, and wherein each of multiple page table entries (PTEs) of a page table of the main processor page tables corresponds to a different one of the multiple pages of the main processor and includes a base address of the corresponding page.

The main processor page tables 200 and/or the co-processor page tables 202 may include multiple page tables arranged to form a page table hierarchy. FIG. 3 is a diagram of one embodiment of the main processor page tables 200 and the process portion 204 of FIG. 2. In the embodiment of FIG. 3, the main processor page tables 200 include a page table 300. The page table 300 may be, for example, a lowest-ordered page table in a main processor page table hierarchy. The page table 300 includes multiple page table entries (PTEs) 302, and the process portion 204 includes multiple memory pages (i.e., pages) 304 of main processor 102 (FIG. 1). Each of the page table entries 302 corresponds to a different one of the pages 304 of the main processor 102 and includes a base address of the corresponding page 304.

Figure 4:
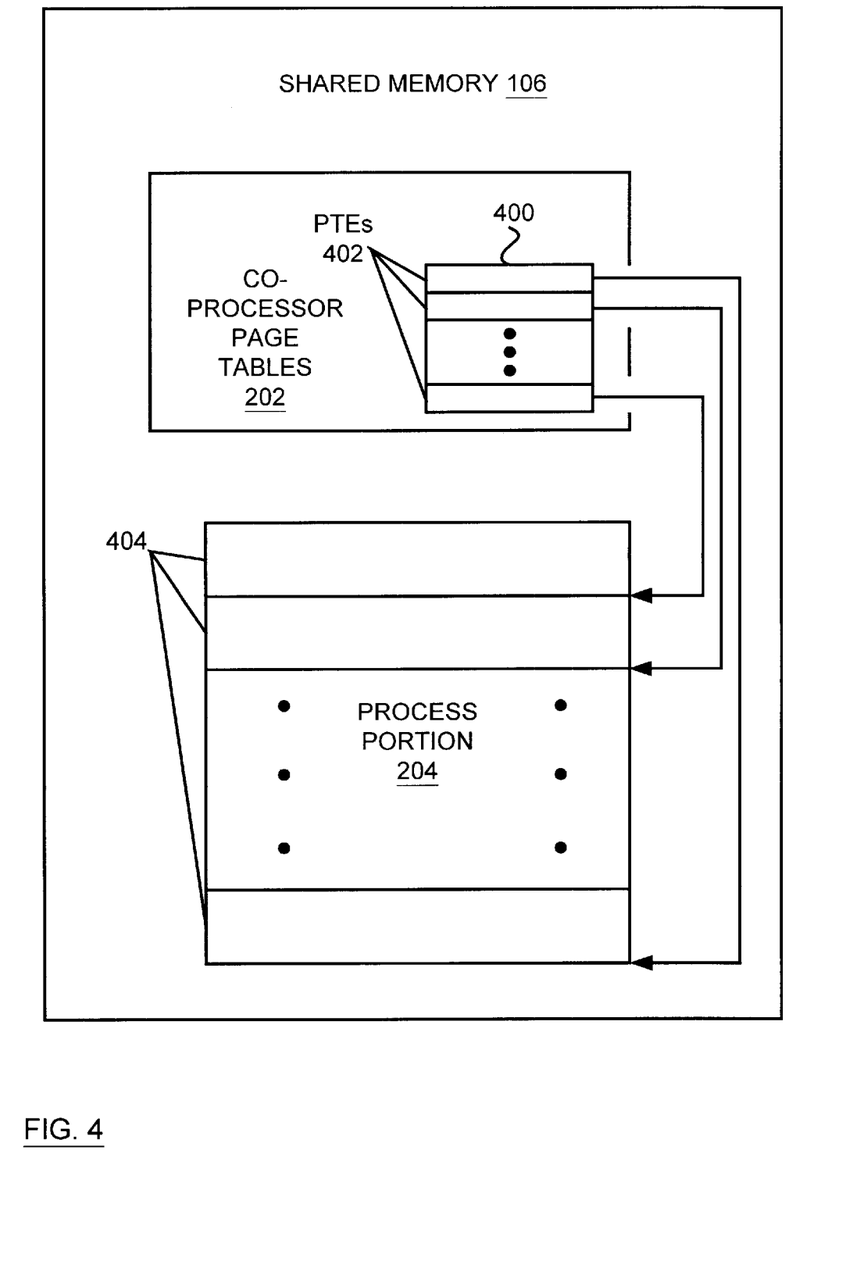
FIG. 4 is a diagram of one embodiment of the co-processor page tables and the process portion of FIG. 2, wherein the process portion includes multiple pages of the co-processor, and wherein each of multiple page table entries (PTEs) of a page table of the co-processor page tables corresponds to a different one of the multiple pages of the co-processor and includes a base address of the corresponding page.

FIG. 4 is a diagram of one embodiment of the co-processor page tables 202 and the process portion 204 of FIG. 2. In the embodiment of FIG. 4, the co-processor page tables 202 includes a page table 400. The page table 400 may be, for example, a lowest-ordered page table in a co-processor page table hierarchy. The page table 400 includes multiple page table entries (PTEs) 402, and the process portion 204 includes multiple pages 404 of the co-processor 104 (FIG. 1). Each of the page table entries 402 corresponds to a different one of the pages 404 of the co-processor 104 and includes a base address of the corresponding page 404.

Figure 5:
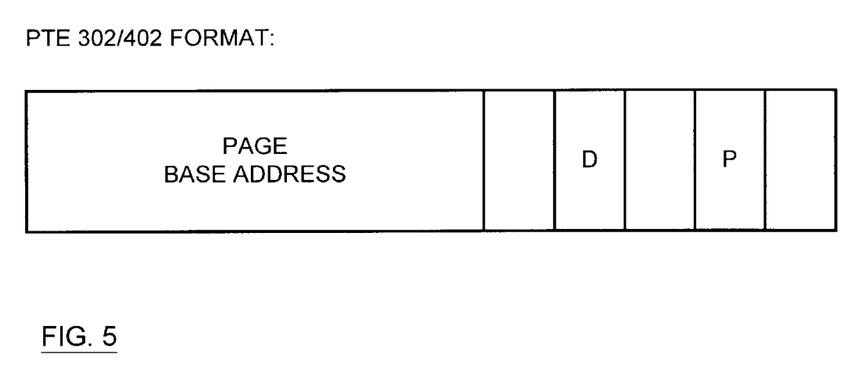
FIG. 5 is a diagram of one embodiment of a format of each of the page table entries (PTEs) of FIGS. 3–4, wherein each of the page table entries includes a page base address field, a dirty (D) bit, and a present (P) bit.

FIG. 5 is a diagram of one embodiment of a format of each of the page table entries (PTEs) 302 (FIG. 3) and 402 (FIG. 4). In the embodiment of FIG. 5, each of the page table entries 302/402 includes a page base address field, a dirty (D) bit, and a present (P) bit. The present (P) bit indicates whether the corresponding page 304/404 is present within process portion 204. When the corresponding page 304/404 is present within the process portion 204, the page base address field specifies a base address of the corresponding page 304/404. The dirty (D) bit indicates whether or not the corresponding page 304/404 has been modified (i.e., written to) since being copied from the device 110 and/or the device 112 (FIG. 1) into the shared memory 106, and thus needs to be written back to the device 110 and/or the device 112 when replaced by another page from device 110 and/or the device 112.

Figure 6:
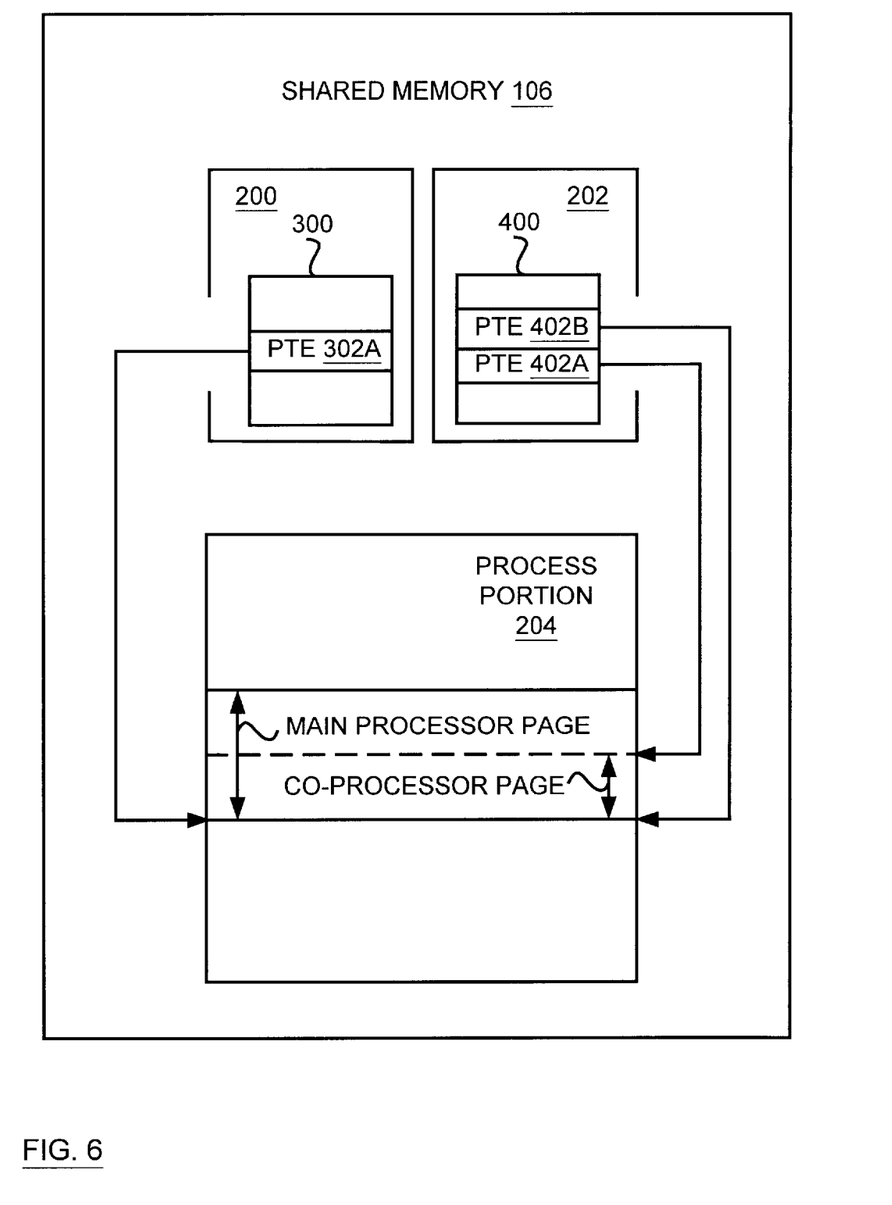
FIG. 6 is a an exemplary embodiment of the main processor page tables, the co-processor page tables, and the process portion of FIG. 2, wherein each page of the main processor is twice the size of each page of the co-processor.

FIG. 6 is a an exemplary embodiment of the main processor page tables 200, the co-processor page tables 202, and the process portion 204 of FIG. 2 wherein each page of the main processor 102 (FIG. 1) is twice the size of each page of the co-processor 104 (FIG. 1). In the embodiment of FIG. 6, the page table 300 of the main processor page tables 200 includes a page table entry 302A, and the page table 400 of the co-processor page tables 202 includes two page table entries 402A and 402B. The page table entry 302A includes (i.e., "points to") the base address of a main processor memory page located in the process portion 204. As shown in FIG. 6, two adjacent memory pages of the co-processor 104 occupy the same physical memory space as the main processor memory page. The page table entries 402A and 402B of the co-processor page tables 202 include (i.e., "point to") the base addresses of the two adjacent memory pages of the co-processor 104 corresponding to the main processor memory page. The page table entries 402A and 402B may be adjacent page table entries of the co-processor page tables 202 as indicated in FIG. 6.

In the embodiment of FIGS. 1–6, it will be understood that while only the memory pages 304 (FIG. 3) and 404 (FIG. 4) within the process portion 204 (FIGS. 2–4 and 6) and the corresponding page table entries 302 (FIG. 3) and 402 (FIG. 4) are shown, the entire physical address space of the shared memory 106 is accessible by both the main processor 102 (FIG. 1) and the co-processor 104 (FIG. 1) via virtual memory and the associated virtual-to-physical address translation mechanisms.

In general, the memory page sizes of the co-processor 104 (FIG. 1) and the main processor 102 (FIG. 1) are typically integer multiples of each other. In other words, the memory page sizes of the main processor 102 may be $i$ times the memory page sizes of the co-processor 104, where i is an integer and i≧1. Conversely, the memory page sizes of the co-processor 104 may be i times the memory page sizes of the main processor 102, where i is an integer and i≧1. Where i=1, the memory page sizes of the main processor 102 and the co-processor 104 are the same. The methods and systems described herein are, however, especially applicable where the memory page sizes of the main processor 102 and the co-processor 104 are different, and the memory page sizes of the main processor 102 are either i or 1/i times the memory page sizes of the co-processor 104, where i is an integer and i≧2. Where the memory page sizes of the main processor 102 are i times the memory page sizes of the co-processor 104, each memory page of the main processor 102 and i memory pages of the co-processor 104 may occupy the same physical address region of the process portion 204 (FIGS. 2–4) as described above. On the other hand, where the memory page sizes of the main processor 102 are 1/i times the memory page sizes of the co-processor 104, each memory page of the co-processor 104 and i memory pages of the main processor 102 may occupy the same physical address region of the process portion 204.

It is noted that memory page sizes are typically determined by numbers of bits, and are thus typically powers of two. Thus the memory page sizes of the main processor 102 may be either $2^i$ or $\frac{1}{2}^i$ times the memory page sizes of the co-processor 104, where i is an integer and i≧0.

As described above, the co-processor 104 (FIG. 1) may have functional capabilities that the main processor 102 (FIG. 1) does not have. In this situation, instructions and data (i.e., code) of a process, stored in the device 110 and/or the device 112 (FIG. 1), may have a marker which indicates that execution of the process code requires the functional capabilities of the co-processor 104. When the process code is loaded into the process portion 204 of the shared memory 106 by a loader routine of the main processor operating system 206, the loader routine may inform the main processor operating system 206 that execution of the process code requires the functional capabilities of the co-processor 104.

When the loader routine informs the main processor operating system 206 that process code being loaded into the process portion 204 requires the functional capabilities of the co-processor 104, the main processor operating system 206 may determine one or more portions of the process code that require the functional capabilities of the co-processor 104, and may update the main processor page tables 200 and the co-processor page tables 202 at the same time (i.e., in parallel).

Hereinbelow, the one or more portions of the process code that require the functional capabilities of the co-processor 104 will themselves be considered separate processes. The main processor 102 may send one or more code execution messages to the co-processor 104 (e.g., via any suitable interprocess communication method). Each code execution message may include, for example, a base address of a highest-ordered page table of the co-processor page tables 202 associated with a process to be executed (i.e., "run"), and a virtual address of a first instruction of the process. In response to a given code execution message, the co-processor 104 may schedule the associated process for execution.

The co-processor 104 may include a page table register for storing a base address of a highest-ordered page table of the co-processor page tables 202. When the co-processor 104 begins executing a given process, the co-processor 104 may first load into the page table register the address of the highest-ordered page table of the co-processor page tables 202 included in the corresponding code execution message.

In some embodiments, the main processor operating system 206 may only load the highest-ordered page table of the co-processor page tables 202 into a "locked" portion of shared memory 106, and may wait until the co-processor 104 signals a page fault to load any additional page tables of the co-processor page tables 202 into the shared memory 106. It is noted that any additional page tables of the co-processor page tables 202 need not be maintained in "locked" memory. If any page including a page table of the co-processor page tables 202 is removed from the shared memory 106 (i.e., "paged out"), the removal action must be reflected in the next highest level of the coprocessor page table hierarchy.

In addition to the above described "application" virtual address space mapping generated by the main processor operating system 206 and included in the co-processor page tables 202 for each process to be executed by the co-processor 104 (FIG. 1), the main processor operating system 206 (FIG. 2) also generates a "supervisor mode" virtual address space mapping for each process. The supervisor mode virtual address space mapping may be accessed by the kernel 116 (FIG. 1) of the co-processor 104 while running the associated process. When the co-processor 104 receives a fault or interrupt signal while running the associated process, the kernel 116 accesses code stored in the process portion 204 of the shared memory 106 via the supervisor mode virtual address space mapping to service the fault or interrupt. The supervisor mode virtual address space mapping may be the same for all processes, thus the same supervisor mode virtual address space mapping may be included in the co-processor page tables 202 generated by the main processor operating system 206 for each process.

While running a process, the co-processor 104 may attempt to access code within a memory page that is not present in the shared memory 106. In this situation, the present (P) bit of the corresponding page table entry 402 (FIG. 4) of co-processor page tables 202 indicates the corresponding page is not present in shared memory 106. The kernel 116 (FIG. 1) of the co-processor 104 suspends the process that caused the page fault, and informs the main processor operating system 206 of the page fault (e.g., via an interrupt or a message conveyed via interprocess communication).

In response to the page fault condition in the co-processor 104, the main processor operating system 206 "maps" the page needed by the co-processor 104 to the corresponding memory page of the main processor 102, and brings the corresponding memory page into the shared memory 106. The main processor operating system 206 copies the corresponding memory page from the device 110 and/or the device 112 (FIG. 1) into the shared memory 106, and updates both the main processor page tables 200 and the co-processor page tables 202. The main processor operating system 206 then informs the co-processor 104 that the needed page is now present in the shared memory 106 (e.g., via a message conveyed via interprocess communication). When the kernel 116 of the co-processor 104 receives the message, the kernel 116 makes the suspended process ready and restarts the process.

As described above, the co-processor 104 includes the TLB 118 (FIG. 1) for storing recently used page table entries 402 (FIG. 4). The TLB 118 reduces the number of accesses to the shared memory 106 required to obtain page table entries 402 from the page table 400 of the co-processor page tables 202, thereby increasing the performance of the co-processor 104. As described above, to further preclude accesses to page tables stored in memory, TLBs typically include dirty (D) bits for recording write accesses to pages stored in memory. The contents of the dirty (D) bits are typically not visible outside of the TLB.

In the embodiment of FIGS. 1–6, the kernel 116 (FIG. 1) of the co-processor 104 controls the operation of the TLB 118 within the co-processor 104. The TLB 118 has multiple entries for storing the most recently used page table entries of the co-processor 104. Each entry of the TLB 118 may have a dirty (D) bit indicating whether the corresponding memory page was modified (by the co-processor 104) while in the shared memory 106. For example, when the kernel 116 removes (or directs the removal of) an entry of the TLB 118 (e.g., to make room for a more recently used page table entry 402), the kernel 116 may check the dirty (D) bit value of the entry. If the dirty (D) bit indicates the corresponding memory page was modified (by the co-processor 104) while in the shared memory 106, the kernel 116 may update the dirty (D) bit of the corresponding page table entry 402 in the page table 400 to reflect that the corresponding memory page was modified while in the shared memory 106, and needs to be written to storage (i.e., device 100 and/or device 112 of FIG. 1) when removed from the shared memory 106.

Due to the presence of the TLB 118 in the co-processor 104, it is possible for the co-processor 104 to continue to use one of the page table entries 402 stored in the TLB 118 even after the main processor operating system 206 has removed the corresponding memory page from the page table 400 of the co-processor page tables 202. For this reason, when the main processor operating system 206 is to remove a memory page from the shared memory 106, the main processor operating system 206 must first inform the kernel 116 that any entry of the TLB 118 corresponding to the memory page to be removed from the shared memory 106 should be removed from the TLB 118. It is noted that entries of the TLB 118 corresponding to the memory page to be removed from the shared memory 106 correspond to a physical address range of the memory page to be removed from the shared memory 106.

As described above, when the kernel 116 removes the corresponding entry from the TLB 118, if the dirty (D) bit value of the corresponding entry indicates the memory page to be removed from shared memory 106 was modified (by co-processor 104) while in the shared memory 106, the kernel 116 updates the dirty (D) bit of the corresponding page table entry 402 in the page table 400 of the co-processor page tables 202 to reflect that the memory page to be removed from the shared memory 106 was modified while in the shared memory 106, and needs to be written to storage (i.e., device 100 and/or device 112 of FIG. 1) when removed from the shared memory 106.

The main processor operating system 206 may then continue with the removal of the memory page from the shared memory 106. The main processor operating system 206 checks the dirty (D) bit values of: (i) one or more page table entries 302 corresponding to the page to be removed in the page table 300 of the main processor page tables 200, and (ii) one or more page table entries 402 corresponding to the page to be removed in the page table 400 of the co-processor page tables 202. If any of the dirty (D) bits indicate the memory page to be removed from the shared memory 106 was modified while in the shared memory 106, the main processor operating system 206 writes the memory page to be removed from the shared memory 106 "back" to the storage (e.g., to device 110 of FIG. 1 and/or device 112 of FIG. 1).

It is noted that once the corresponding entry is removed from the TLB 118, any attempt by the co-processor 104 to access the page to be removed from the shared memory 106 will require accessing the page table 400 to obtain the page table entry 402 corresponding to the page to be removed from the shared memory 106. Once the page to be removed from the shared memory 106 has been removed from the shared memory 106, attempts by the co-processor 104 to access the removed page will (desirably) result in a page fault.

When the co-processor 104 switches from running a first process to running a second process, the co-processor 104 loads a new page table base address associated with the second process into the page table register, and all entries of the TLB 118 associated with the first process are removed from the TLB 118. As a result, as a performance feature, the main processor operating system 206 need not inform the kernel 116 of the co-processor 104 of a page to be removed from the shared memory 106 unless the co-processor 104 is currently running a process which has a mapping to the page to be removed from the shared memory 106.

Figure 7A:
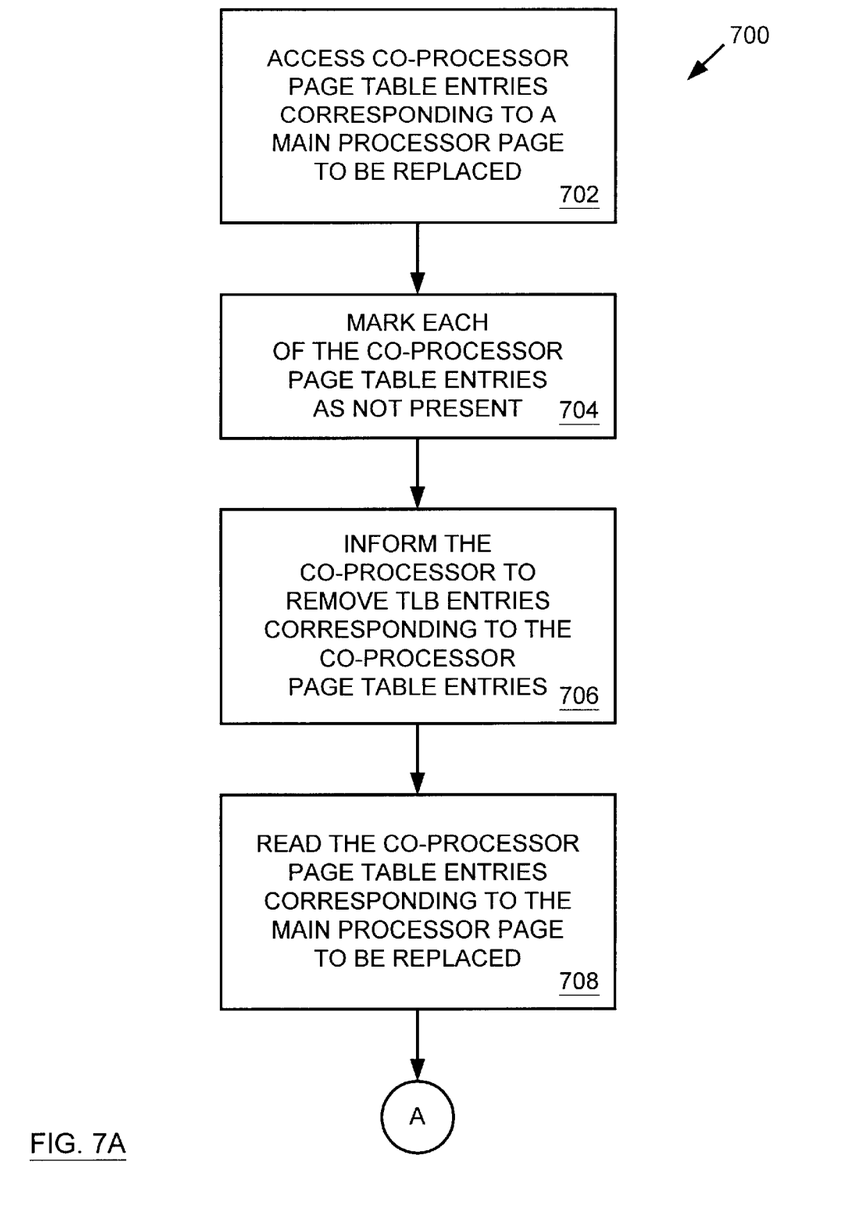
FIGS. 7A–7B in combination form a flow chart of one embodiment of a virtual memory page replacement method for use in a multiprocessor computer system.
Figure 7B:
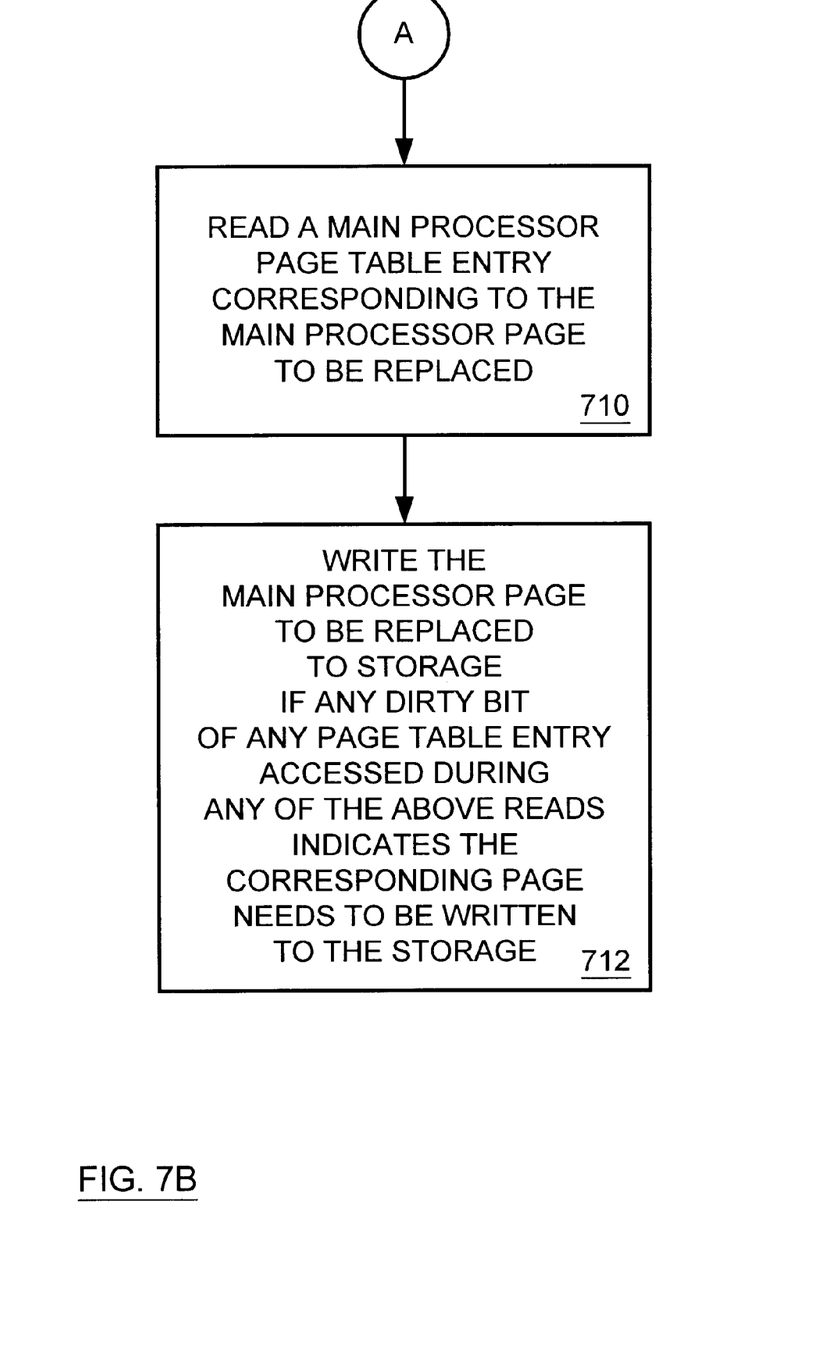

FIGS. 7A–7B in combination form a flow chart of one embodiment of a virtual memory page replacement method 700 for use in a multiprocessor computer system. The virtual memory page replacement method 700 is designed to help maintain paged memory coherence within the multiprocessor system. Although the method 700 will be described herein as directed to multiprocessor computer system 100 of FIG. 1, the method 700 may be implemented in any multiprocessor computer system. Regarding the multiprocessor computer system 100 of FIG. 1, the method 700 may be embodied within the main processor operating system 206 (FIG. 2).

During a step 702 of the method 700, each page table entry 402 (FIG. 4) of the co-processor 104 corresponding to a memory page of the main processor 102, currently stored in shared memory 106 and to be replaced, is accessed. Each page table entry 402 of the co-processor 104 corresponding to the memory page of the main processor 102 to be replaced is marked to indicate the corresponding page of the co-processor 104 is not present in the shared memory 106 during a step 704.

For example, each page table entry 402 of the co-processor 104 corresponding to the memory page of the main processor 102 to be replaced may be read from the shared memory 106 during the step 702 (e.g., during a first read operation). After reading a given page table entry 402 (e.g., during the step 702), the value of the present (P) bit of the given page table entry 402 may be changed (e.g., "cleared" or set to logic '0') to indicate the corresponding page of the co-processor 104 is not present in the shared memory 106. The given page table entry 402 may then be written back to the shared memory 106 (e.g., during the step 704). Due to the fact that the co-processor 104 may access the given page table entry 402, the reading and writing of the given page table entry 402 may be accomplished as an "atomic" transaction.

During a step 706, the co-processor 104 is informed of a need to remove entries of the TLB 118 corresponding to each of the page table entries 402 of the co-processor 104 corresponding to the memory page of the main processor 102 to be replaced. For example, the main processor 102 may send a message (e.g., a "PageRemoval" message) to the co-processor 104 indicating the need to remove any entry of the TLB 118 corresponding to a memory page of the co-processor 104 which corresponds to the memory page of the main processor 102 to be replaced. After removing any such entries of the TLB 118, the co-processor 104 may send a message to the main processor 102 indicating accomplishment of the removal.

A read is then performed of the page table entries 402 of the co-processor 104 corresponding to the memory page of the main processor 102 to be replaced during a step 708. During a step 710, a read is performed of the page table entry 302 (FIG. 3) corresponding to the memory page of the main processor 102 to be replaced. During a step 712, the memory page of the main processor 102 to be replaced is written from the shared memory 106 to the storage (i.e., device 110 and/or device 112 of FIG. 1) if: (i) a dirty bit of one of the page table entries 402 obtained during the read of step 708 indicates the corresponding memory page of the co-processor 104 needs to be written to the storage, or (ii) the dirty bit of the one of the page table entries 302 corresponding to the memory page of the main processor 102 to be replaced and obtained during the read of step 710 indicates the memory page of the main processor 102 to be replaced needs to be written to the storage.

As described above, each page table entry 402 of the co-processor 104 corresponding to the memory page of the main processor 102 to be replaced may be read from the shared memory 106 during the step 702 (e.g., during a first read operation). After reading a given page table entry 402 (e.g., during the step 702), the value of the present (P) bit of the given page table entry 402 may be changed (e.g., "cleared" or set to logic '0') to indicate the corresponding page of the co-processor 104 is not present in the shared memory 106. The given page table entry 402 may then be written back to the shared memory 106 (e.g., during the step 704). Although it may be advantageous to not change the value of the dirty (D) bit of the given page table entry 402 when the present (P) bit is changed, this need not be the case.

In some embodiments, both the present (P) bit and the dirty (D) bit of the given page table entry 402 may be cleared before the given page table entry 402 is written back to the shared memory 106. In such embodiments, each page table entry 402 of the co-processor 104 corresponding to the memory page of the main processor 102 to be replaced may be read during a first read operation of the step 702, and the read operation of the step 708 may constitute a second read operation. During the above step 712, the memory page of the main processor 102 to be replaced may be written from the shared memory 106 to the storage (i.e., device 110 and/or device 112 of FIG. 1) if: (i) a dirty bit of one of the page table entries 402 obtained during the first read operation (e.g., of the step 702) indicates the corresponding memory page of the co-processor 104 needs to be written to the storage, or (ii) a dirty bit of one of the page table entries 402 obtained during the second read operation (e.g., of the step 708) indicates the corresponding memory page of the co-processor 104 needs to be written to the storage, or (iii) the dirty bit of the one of the page table entries 302 corresponding to the memory page of the main processor 102 to be replaced and obtained during the read of step 710 indicates the memory page of the main processor 102 to be replaced needs to be written to the storage.

As described above, the co-processor 104 is informed during step 706 of the need to remove entries of the TLB 118 corresponding to each of the page table entries 402 of the co-processor 104 corresponding to the memory page of main processor 102 to be replaced. The co-processor 104, executing the code of kernel 116, may respond by locating one of the entries of the TLB 118 corresponding to one of the page table entries 402 of the co-processor 104 corresponding to the memory page of main processor 102 to be replaced. If the dirty bit of the one of the entries of the TLB 118 indicates the corresponding memory page of the co-processor 104 needs to be written to the storage, the co-processor 104 may update the dirty bit of the corresponding one of the page table entries 402 in shared memory 106 to indicate that the corresponding memory page of the co-processor 104 needs to be written to the storage. The co-processor 104 may then clear the one of the entries of the TLB 118. The co-processor 104 may repeat the above actions for all entries of the TLB 118 corresponding to each of the page table entries 402 of the co-processor 104 corresponding to the memory page of main processor 102 to be replaced.

In determining that the memory page of main processor 102 (e.g., a first memory page of main processor 102) needs to be replaced, the main processor 102 may receive an indication of a page fault condition in the co-processor 104 (e.g., a message from co-processor 104 indicating a page fault in the co-processor 104). The main processor 102 may determine that the first page of the main processor 102, stored in the shared memory 106, must be replaced by a second page of the main processor 102, stored in the storage (i.e., device 110 and/or device 112 of FIG. 1), to clear the page fault condition in the co-processor 104.

Referring back to FIG. 1, the main processor 102 of multiprocessor computer network 100 communicates with the co-processor 104 (e.g., via the bus 108 and/or the shared memory 106 as described above). The main processor 102 and the co-processor 104 may communicate, for example, via messages. Messages exchanged between main processor 102 and the co-processor 104 may include, for example, a "CreateProcess" message. The main processor 102 may send a "CreateProcess" message to the co-processor 104 indicating a process to be scheduled for execution. The "CreateProcess" message may include a "Process Id" identifying the process, and a base address of a highest-ordered page table generated by the main processor operating system 206 (FIG. 2) and associated with the process. When the process is to be executed (i.e., becomes active), the kernel 116 of the co-processor 104 may store the base address of the highest-ordered page table in the page table base address register of the co-processor 104 as described above.

The main processor 102 may also send a "PageAdded" message to the co-processor 104 indicating that a particular memory page of the co-processor 104 has been stored within (i.e., added to) shared memory 106. The "PageAdded" message may include a "Process Id" identifying a process which may require access to the added memory page, and a base address of the added memory page. When the process having the "Process Id" is executed, the kernel 116 of the co-processor 104 may remove (or direct the removal of) any entry in TLB 118 corresponding to the base address of the added memory page. If the added memory page was added due to a page fault condition during execution of a process, the kernel 116 may resume execution of the process.

The main processor 102 may also send a "PageRemoved" message to the co-processor 104 indicating that a particular memory page of the co-processor 104 has been removed from shared memory 106. The "PageRemoved" message may include a "Process Id" identifying a process which may have a mapping to the removed memory page, and a base address of the removed memory page. When the process having the "Process Id" is executed, the kernel 116 of the co-processor 104 may remove (or direct the removal of) any entry in TLB 118 corresponding to the base address of the removed memory page.

The co-processor 104 may send a "ProcessStoppedDueToPageFault" message to the main processor 102 indicating that execution of a certain process has been suspended due to a page fault condition. The "ProcessStoppedDueToPageFault" message may include a "Process Id" identifying the process stopped due to the page fault, a virtual address which caused the page fault condition, and a write flag indicating whether or not access to a page added to clear the page fault condition needs to be read-only or read-write.

In response to the "ProcessStoppedDueToPageFault" message from the co-processor 104, the main processor operating system 206 may bring a memory page of the main processor 102 into the shared memory 106 having a physical address range which includes a physical address corresponding to the virtual address which caused the page fault. The main processor operating system 206 may mark the page for the required access, and may update the main processor page tables 200 and the co-processor page tables 202. As described above, the added memory page of the main processor 102 may correspond to one or more "added" memory pages of the co-processor 104. The main processor 102 may send one or more "PageAdded" messages to the co-processor 104 identifying the one or more added memory pages of the co-processor 104 corresponding to the added memory page of the main processor 102.

It is noted that the entries of the TLB 118 (FIG. 1) of the co-processor 104 need not include dirty (D) bits for the method 700 of FIGS. 7A–B to be useful. Further, the operations of the kernel 116 (FIG. 1) of the co-processor 104 may be carried out by hardware (e.g., a digital logic circuit).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A virtual memory page replacement method for use in a multiprocessor system comprising a first processor and a second processor, the method comprising:

accessing a set of page table entries of the second processor, wherein each of the set of page table entries corresponds to a different page of a set of pages of the second processor, and wherein each page of the set of pages of the second processor is stored in a memory and corresponds to a first page of the first processor to be removed from the memory, and wherein each page table entry of the second processor comprises a present bit and a dirty bit, and wherein the present bit has a value indicating whether the corresponding page of the second processor is present in the memory, and wherein the dirty bit has a value indicating whether the corresponding page of the second processor needs to be written to a storage;

changing a value of the present bit of each of the set of page table entries to indicate that the corresponding page of the second processor is not present in the memory, wherein the changing is performed such that the value of the dirty bit of each of the set of page table entries is not changed;

informing the second processor of a need to remove any entry of a buffer of the second processor corresponding to a page of the set of pages, wherein the buffer includes multiple entries;

reading each of the set of page table entries; wherein the read is performed after the informing;

reading a page table entry corresponding to the first page of the first processor, wherein the page table entry comprises a dirty bit indicating whether or not the first bit needs to be written to the storage; and writing the first page of the first processor from the memory to the storage if: (i) a dirty bit of at least one of the set of page table entries obtained during the reading of each of the set of page table entries indicates the corresponding page of the second processor needs to be written to the storage, or (ii) the dirty bit of the page table entry obtained during the reading of the page table entry of the first processor indicates the first page of the first processor needs to be written to the storage.

2. The virtual memory page replacement method as recited in claim 1, wherein the informing comprises:

informing the second processor of a need to remove any entry of a buffer of the second processor corresponding to a page of the set of pages, wherein the buffer includes multiple entries, and wherein each entry of the buffer comprises a dirty bit indicating whether or not a corresponding page of the second processor needs to be written to the storage;

and wherein the virtual memory page replacement method further comprises:

responding to the informing by:

locating an entry of the buffer corresponding to a page of the set of pages;

if the dirty bit of the entry corresponding to the page of the set of pages indicates the page of the set of pages needs to be written to the storage, updating the dirty bit of the page table entry of the second processor corresponding to the page of the set of pages to indicate that the page of the set of pages needs to be written to the storage; and clearing the entry corresponding to the page of the set of pages.

3. The virtual memory page replacement method as recited in claim 1, wherein the informing the second processor comprises:

sending a message to the second processor indicating a need to clear any entry of the buffer of the second processor corresponding to a page of the set of pages.

4. The virtual memory page replacement method as recited in claim 1, further comprising:

receiving an indication of a page fault condition in the second processor; and determining that a first page of the first processor, stored in the memory, must be replaced by a second page of the first processor, stored in the storage, to clear the page fault condition in the second processor.

5. The virtual memory page replacement method as recited in claim 4, wherein the receiving the indication comprises:

receiving a message from the second processor indicating a page fault condition in the second processor.

6. A virtual memory page replacement method for use in a multiprocessor system comprising a first processor and a second processor, the method comprising:

performing a first read of each of a set of page table entries of the second processor, wherein each of the set of page table entries corresponds to a different page of a set of pages of the second processor, wherein each page of the set of pages of the second processor is stored in a memory and corresponds to a first page of the first processor to be removed from the memory, and wherein each page table entry of the second processor comprises a dirty bit indicating whether or not the corresponding page of the second processor needs to be written to a storage;

marking each page table entry of the set of page table entries to indicate the corresponding page of the second processor is not present in the memory;

informing the second processor of a need to remove any entry of a buffer of the second processor corresponding to a page of the set of pages, wherein the buffer includes multiple entries, and wherein each entry of the buffer comprises a dirty bit indicating whether or not a corresponding page of the second processor needs to be written to the storage;

performing a second read of each of the set of page table entries, wherein the second read is performed after the informing;

performing a read of a page table entry corresponding to the first page of the first processor, wherein the page table entry comprises a dirty bit indicating whether or not the first bit needs to be written to the storage; and writing the first page of the first processor from the memory to the storage if: (i) a dirty bit of at least one of the set of page table entries obtained during the first read of each of the set of page table entries of the second processor indicates the corresponding page of the second processor needs to be written to the storage, or (ii) a dirty bit of at least one of the set of page table entries obtained during the second read of each of the set of page table entries of the second processor indicates the corresponding page of the second processor needs to be written to the storage, or (iii) the dirty bit of the page table entry obtained during the read of the page table entry of the first processor indicates the first page of the first processor needs to be written to the storage.

7. The virtual memory page replacement method as recited in claim 6, further comprising:

responding to the informing by:
locating an entry of the buffer corresponding to a page of the set of pages;
if the dirty bit of the entry corresponding to the page of the set of pages indicates the page of the set of pages needs to be written to the storage, updating the dirty bit of the page table entry of the second processor corresponding to the page of the set of pages to indicate that the page of the set of pages needs to be written to the storage; and
clearing the entry corresponding to the page of the set of pages.

8. The virtual memory page replacement method as recited in claim 6, wherein the informing the second processor comprises:

sending a message to the second processor indicating a need to clear any entry of the buffer of the second processor corresponding to a page of the set of pages.

9. The virtual memory page replacement method as recited in claim 6, further comprising:

receiving an indication of a page fault condition in the second processor; and
determining that a first page of the first processor, stored in the memory, must be replaced by a second page of the first processor, stored in the storage, to clear the page fault condition in the second processor.

10. The virtual memory page replacement method as recited in claim 9, wherein the receiving the indication comprises:

receiving a message from the second processor indicating a page fault condition in the second processor.

11. A virtual memory page replacement method for use in a multiprocessor system comprising a first processor and a second processor, the method comprising:

receiving a message from the second processor indicating a page fault condition in the second processor;

determining that a first page of the first processor, stored in the memory, must be replaced by a second page of the first processor, stored in the storage, to clear the page fault condition in the second processor;

performing a first read of each of a set of page table entries of the second processor, wherein each of the set of page table entries corresponds to a different page of a set of pages of the second processor, wherein each page of the set of pages of the second processor is stored in the memory and corresponds to the first page of the first processor, and wherein each page table entry of the second processor comprises a dirty bit indicating whether or not the corresponding page of the second processor needs to be written to the storage;

marking each of the set of page table entries to indicate the corresponding page of the second processor is not present in the memory;

sending a message to the second processor indicating a need to remove any entry of a buffer of the second processor corresponding to a page of the set of pages, wherein the buffer includes multiple entries, and wherein each entry of the buffer comprises a dirty bit indicating whether or not a corresponding page of the second processor needs to be written to the storage;

performing a second read of each of the set of page table entries, wherein the second read is performed after the sending of the message;

performing a read of a page table entry corresponding to the first page of the first processor, wherein the page table entry comprises a dirty bit indicating whether or not the first bit needs to be written to the storage; and writing the first page of the first processor from the memory to the storage if: (i) a dirty bit of at least one of the set of page table entries obtained during the first read of the set of page table entries of the second processor indicates the corresponding page of the second processor needs to be written to the storage, or (ii) a dirty bit of at least one of the set of page table entries obtained during the second read of each of the set of page table entries of the second processor indicates the corresponding page of the second processor needs to be written to the storage, or (iii) the dirty bit of the page table entry obtained during the read of the page table entry of the first processor indicates the first page of the first processor needs to be written to the storage.

12. A carrier medium comprising program instructions for carrying out a virtual memory page replacement method in a multiprocessor system comprising a fist processor and a second processor, wherein the program instructions are operable to implement:

accessing a set of page table entries of the second processor, wherein each of the set of page table entries corresponds to a different page of a set of pages of the second processor, and wherein each page of the set of pages of the second processor is stored in a memory and corresponds to a first page of the first processor to be removed from the memory, and wherein each page table entry of the second processor comprises a present bit and a dirty bit, and wherein the present bit has a value indicating whether the corresponding page of the second processor is present in the memory, and wherein the dirty bit has a value indicating whether the corresponding page of the second processor needs to be written to a storage;

changing a value of the present bit of each of the set of page table entries to indicate that the corresponding page of the second processor is not present in the memory, wherein the changing is performed such that the value of the dirty bit of each of the set of page table entries is not changed;

informing the second processor of a need to remove any entry of a buffer of the second processor corresponding to a page of the set of pages, wherein the buffer includes multiple entries;

reading each of the set of page table entries; wherein the read is performed after the informing;

reading a page table entry corresponding to the first page of the first processor, wherein the page table entry comprises a dirty bit indicating whether or not the first bit needs to be written to the storage; and writing the first page of the first processor from the memory to the storage if: (i) a dirty bit of at least one of the set of page table entries obtained during the reading of each of the set of page table entries indicates the corresponding page of the second processor to be written to the storage, or (ii) the dirty bit of the page table entry obtained during the reading of the page table entry of the first processor indicates the first page of the first processor needs to be written to the storage.

13. The carrier medium as recited in claim 12, wherein the carrier medium is a computer-readable storage medium.

14. The carrier medium as recited in claim 8, wherein the computer-readable storage medium is a floppy disk or a compact disk read only memory (CD-ROM) disk.

15. A system, comprising:

a first processor;

a second processor in communication with the first processor;

a memory operably coupled to the first and second processors;

a storage device operably coupled to the first processor;

means for accessing a set of page table entries of the second processor, wherein each of the set of page table entries corresponds to a different page of a set of pages of the second processor, and wherein each page of the set of pages of the second processor is stored in the memory and corresponds to a first page of the first processor to be removed from the memory, and wherein each page table entry of the second processor comprises a present bit and a dirty bit, and wherein the present bit has a value indicating whether the corresponding page of the second processor is present in the memory, and wherein the dirty bit has a value indicating whether the corresponding page of the second processor needs to be written to the storage device;

means for changing a value of the present bit of each of the set of page table entries to indicate that the corresponding page of the second processor is not present in the memory, wherein the changing is performed such that the value of the dirty bit of each of the set of page table entries is not changed;

informing the second processor of a need to remove any entry of a buffer of the second processor corresponding to a page of the set of pages, wherein the buffer includes multiple entries;

means for reading each of the set of page table entries; wherein the read is performed after the informing;

means for reading a page table entry corresponding to the first page of the first processor, wherein the page table entry comprises a dirty bit indicating whether or not the first bit needs to be written to the storage device; and means for writing the first page of the first processor from the memory to the storage device if: (i) a dirty bit of at least one of the set of page table entries obtained during the reading of each of the set of page table entries indicates the corresponding page of the second processor needs to be written to the storage device, or (ii) the dirty bit of the page table entry obtained during the reading of the page table entry of the first processor indicates the fire page of the first processor needs to be written to the storage device.

* * * * *